(12) United States Patent
Moore et al.

(10) Patent No.: US 9,189,114 B2
(45) Date of Patent: Nov. 17, 2015

(54) FACE DETECTION WITH TRANSCAPACITIVE SENSING

(71) Applicant: Synaptics Incorporated, San Jose, CA (US)

(72) Inventors: Tyler Moore, Redwood City, CA (US); Derek Solven, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 104 days.

(21) Appl. No.: 13/950,176

(22) Filed: Jul. 24, 2013

(65) Prior Publication Data

US 2015/0029128 A1 Jan. 29, 2015

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 6,289,136 B1 * | 9/2001 | Oshino et al. | 382/298 |
| 6,492,979 B1 | 12/2002 | Kent et al. | |
| 6,636,630 B1 * | 10/2003 | Adachi et al. | 382/176 |
| 7,777,732 B2 | 8/2010 | Herz et al. | |
| 8,239,784 B2 | 8/2012 | Hotelling et al. | |
| 8,269,511 B2 * | 9/2012 | Jordan | 324/679 |
| 8,531,433 B2 * | 9/2013 | Bulea | 345/174 |
| 2006/0238521 A1 | 10/2006 | Westerman et al. | |
| 2006/0238522 A1 | 10/2006 | Westerman et al. | |
| 2009/0073134 A1 * | 3/2009 | Huang et al. | 345/173 |
| 2009/0231282 A1 | 9/2009 | Fyke | |
| 2010/0127995 A1 | 5/2010 | Rigazio et al. | |
| 2010/0164889 A1 * | 7/2010 | Hristov et al. | 345/173 |
| 2010/0292945 A1 * | 11/2010 | Reynolds et al. | 702/65 |
| 2011/0057670 A1 * | 3/2011 | Jordan | 324/679 |
| 2011/0279408 A1 * | 11/2011 | Urano et al. | 345/174 |
| 2012/0019478 A1 * | 1/2012 | Bulea | 345/174 |
| 2012/0158629 A1 | 6/2012 | Hinckley et al. | |
| 2012/0218196 A1 * | 8/2012 | Lv et al. | 345/173 |
| 2012/0293481 A1 * | 11/2012 | Chaji | 345/212 |
| 2013/0002524 A1 * | 1/2013 | Sirpal et al. | 345/1.3 |
| 2013/0038556 A1 * | 2/2013 | Nakai | 345/173 |
| 2013/0050133 A1 | 2/2013 | Brakensiek et al. | |
| 2013/0154999 A1 * | 6/2013 | Guard | 345/174 |
| 2014/0002413 A1 * | 1/2014 | Kim | 345/174 |

* cited by examiner

*Primary Examiner* — Dismery Mercedes
(74) *Attorney, Agent, or Firm* — Osha Liang LLP

(57) ABSTRACT

A processing system configured to detect large objects includes a sensor module with sensor circuitry coupled to transmitter electrodes and receiver electrodes, and configured to transmit transmitter signals with the transmitter electrode and receive resulting signals with the receiver electrodes, the resulting signals including effects corresponding to transmitter signals. The processing system further includes a determination module configured to determine a transition condition is present using a capacitive image, based on the resulting signals, having capacitive pixel values, and operate in large object mode based on the transition condition being present.

17 Claims, 6 Drawing Sheets

FACE DETECTION WITH TRANSCAPACITIVE SENSING

FIELD

This invention generally relates to electronic devices.

BACKGROUND

Input devices such as touch screens are used in a variety of devices including, but not limited to, cell phones, tablet computers, laptop computers, monitors, televisions, handheld gaming devices, and many other devices. Touch screens are able to detect a large variety of inputs, and use that information to perform many different functions.

SUMMARY OF INVENTION

In general, in one aspect, the invention relates to a processing system configured to detect large objects. The processing system includes a sensor module with sensor circuitry coupled to transmitter electrodes and receiver electrodes. The sensor module is configured to transmit transmitter signals with the transmitter electrode and receive resulting signals with the receiver electrodes, and the resulting signals include effects corresponding to transmitter signals. The processing system also includes a determination module configured to determine a transition condition is present using a capacitive image, based on the resulting signals, having capacitive pixel values. The processing system operates in large object mode based on the transition condition being present.

In general, in one aspect, the invention relates to a method for detecting large objects using a processing system. The method includes driving transmitter signals onto transmitter sensor electrodes, receiving resulting signals with receiver sensor electrodes, and determining a transition condition is present using a first capacitive image, based on the resulting signals, having capacitive pixel values. The method further includes operating in large object mode based on the transition condition being present.

In general, in one aspect, the invention relates to an input device for detecting large objects. The input device includes transmitter electrodes, receiver electrodes, and a processing system coupled to the transmitter electrodes and the receiver electrodes. The processing system is configured to drive transmitter signals onto transmitter sensor electrodes, receive resulting signals with receiver sensor electrodes, and determine a transition condition is present using a capacitive image, based on the resulting signals, and having capacitive pixel values. The processing system is further configured to operate in large object mode based on the transition condition being present.

Other aspects and advantages of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Various embodiments provide a processing system, an input device, and a method to detect large objects without using an infrared sensor. For example, embodiments may use a sensor region, such as a touch screen, to detect approaching large objects and then operate in a large object mode. The sensor region may be located within a mobile device (e.g., smartphone), and the large object may correspond to the user's face approaching the mobile device to initiate or receive a phone call. While operating in large object mode, one or more actions may be taken including turning off and/or disabling the sensor region (e.g., touch screen).

Figure 1:
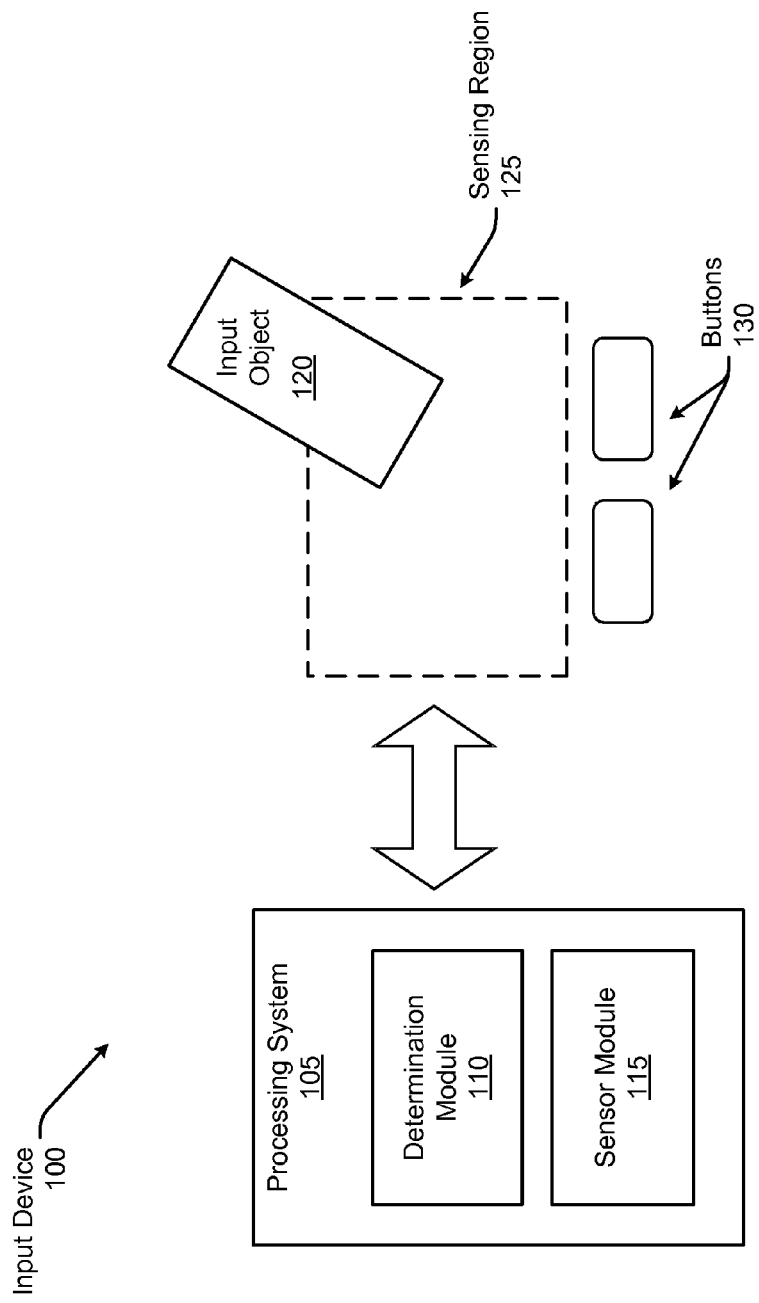
FIG. 1 shows a schematic diagram in accordance with one or more embodiments.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device (100).

The input device (100) may be implemented as a physical part of the electronic system, or may be physically separate from the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad", "touch screen", or a "touch sensor device") configured to sense input provided by one or more input objects (120) in a sensing region (125). Example input objects include fingers, styli, as well as larger objects such as faces.

Sensing region (125) encompasses any space above, around, in and/or near the input device (100) in which the input device (100) is able to detect user input (e.g., user input provided by one or more input objects (120)). The sizes, shapes, and locations of particular sensing regions may vary widely from embodiment to embodiment. In some embodiments, the sensing region (125) extends from a surface of the input device (100) in one or more directions into space until signal-to-noise ratios prevent sufficiently accurate object detection. The distance to which this sensing region (125) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (125) has a rectangular shape when projected onto an input surface of the input device (100).

The input device (100) may utilize any combination of sensor components and sensing technologies to detect user input in the sensing region (125). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (120) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (105) is shown as part of the input device (100). The processing system (105) is configured to operate the hardware of the input device (100) to detect input in the sensing region (125). The processing system (105) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (105) also includes electronically-readable instructions, such as firmware code, software code, and/or the like. In some embodiments, components composing the processing system (105) are located together, such as near sensing element(s) of the input device (100). In other embodiments, components of processing system (105) are physically separate with one or more components close to sensing element(s) of input device (100), and one or more components elsewhere. For example, the input device (100) may be a peripheral coupled to a desktop computer, and the processing system (105) may include software configured to run on a central processing unit of the desktop computer and one or more ICs (perhaps with associated firmware) separate from the central processing unit. As another example, the input device (100) may be physically integrated in a phone, and the processing system (105) may include circuits and firmware that are part of a main processor of the phone. In some embodiments, the processing system (105) is dedicated to implementing the input device (100). In other embodiments, the processing system (105) also performs other functions, such as operating display screens, driving haptic actuators, etc.

The processing system (105) may be implemented as a set of modules that handle different functions of the processing system (105). Each module may include circuitry that is a part of the processing system (105), firmware, software, or a combination thereof. In various embodiments, different combinations of modules may be used. For example, as shown in FIG. 1, the processing system (105) may include a determination module (110) and a sensor module (115). The determination module (110) may include functionality to determine when an input object is in a sensing region, determine signal to noise ratio, determine positional information of an input object, determine a type of input object, perform other determinations, or a combination thereof. Specifically, determination module (110) may include functionality to set thresholds, determine when thresholds are met, calculate variables, identify objects, obtain capacitive images of the sensing region (125), calculate the size of objects, perform comparisons, and/or any other functionality needed to implement the methods described in FIGS. 2-5.

The sensor module (115) may include functionality to drive the sensing elements to transmit transmitter signals and receive resulting signals. For example, the sensor module (115) may include sensory circuitry that is coupled to the sensing elements. The sensor module (115) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (110) and a sensor module (115), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (105) responds to user input (or lack of user input) in the sensing region (125) directly by causing one or more actions. Example actions include changing operating modes, as well as GUI actions such as cursor movement, selection, menu navigation, and other functions. In some embodiments, the processing system (105) provides information about the input (or lack of input) to some part of the electronic system (e.g. to a central processing system of the electronic system that is separate from the processing system (105), if such a separate central processing system exists). In some embodiments, some part of the electronic system processes information received from the processing system (105) to act on user input, such as to facilitate a full range of actions, including mode changing actions and GUI actions.

For example, in some embodiments, the processing system (105) operates the sensing element(s) of the input device (100) to produce electrical signals indicative of input (or lack of input) in the sensing region (125). The processing system (105) may perform any appropriate amount of processing on the electrical signals in producing the information provided to the electronic system. For example, the processing system (105) may digitize analog electrical signals obtained from the sensor electrodes. As another example, the processing system (105) may perform filtering or other signal conditioning. As yet another example, the processing system (105) may subtract or otherwise account for a baseline, such that the information reflects a difference between the electrical signals and the baseline. As yet further examples, the processing system (105) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (105) or by some other processing system. These additional input components may provide redundant functionality for input in the sensing region (125), or some other functionality. FIG. 1 shows buttons (130) near the sensing region (125) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (125) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system (105).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (105)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

In one embodiment, a first set of sensor electrodes are arranged in a first direction, and a second set of sensor electrodes are arranged in a second direction substantially perpendicular to the first direction. It will be appreciated, however, that in various embodiments, a variety of sensor electrode pattern—including ones that vary in sensor electrode layout, size, shape, number, material, and the like—may be suitable in various embodiments.

Each of the first set of sensor electrodes may be ohmically isolated from each of the second set of sensor electrodes. In some embodiments, the first set and second set of sensor electrodes are disposed as a single layer of conductive material on a substrate that are connected by electrical jumpers as appropriate; the sensor electrodes of the first and second sets are separated from each other by local dispositions of insulative material disposed between the regions where the sensor electrodes of the first and second sets overlap each other. The insulative material may comprise one or more patches of insulative material that are printed, sputtered, or otherwise patterned. In some embodiments, the first and second sets of sensor electrodes are separated by one or more substrates. For example, the sensor electrodes of the first set of sensor electrodes may be disposed on a first surface of a substrate, and the sensor electrodes of the second set of sensor electrode may be disposed on a second, opposite surface of the same substrate. In other embodiments, the first and second sensor electrodes may be patterned on the same layer of a substrate. In such embodiments, the sensor electrodes do not cross over each other in the sensing region; any connections may be made in a border region, outside the sensing region. Further, in such an embodiment, various sensor electrode patterns and shapes may be used, each having various numbers of first and second sensor electrodes. As another example, the first and second sets of sensor electrodes may be disposed on different substrates that are laminated together.

In one embodiment, the sensor electrodes are constructed from opaque or substantially opaque conductive materials. In other embodiments, sensor electrodes are constructed in whole or in part from substantially transparent conductive material, such as patterned ITO, ATO, carbon nanotubes, or other substantially transparent materials.

In one embodiment, a first set of sensor electrodes are configured as receiver electrodes, and a second set of sensor electrodes are configured as transmitter electrodes. That is, the first and second sensor electrodes are communicatively coupled with a processing system that operates them to receive or transmit as appropriate. In some embodiments, the first and second sensor electrodes are also shaped for better performance as receiver or transmitter electrodes. The capacitive coupling between the transmitter electrodes and receiver electrodes change with input near the sensing region associated with sensor device. Referring again to FIG. 1, a processing system 110 is shown as part of the input device 100. The processing system 110 is configured to operate the hardware of the input device 100 (including, for example, the various sensor electrodes) to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

Although not shown in FIG. 1, the processing system, the input device, and/or the host system may include one or more computer processor(s) (502), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
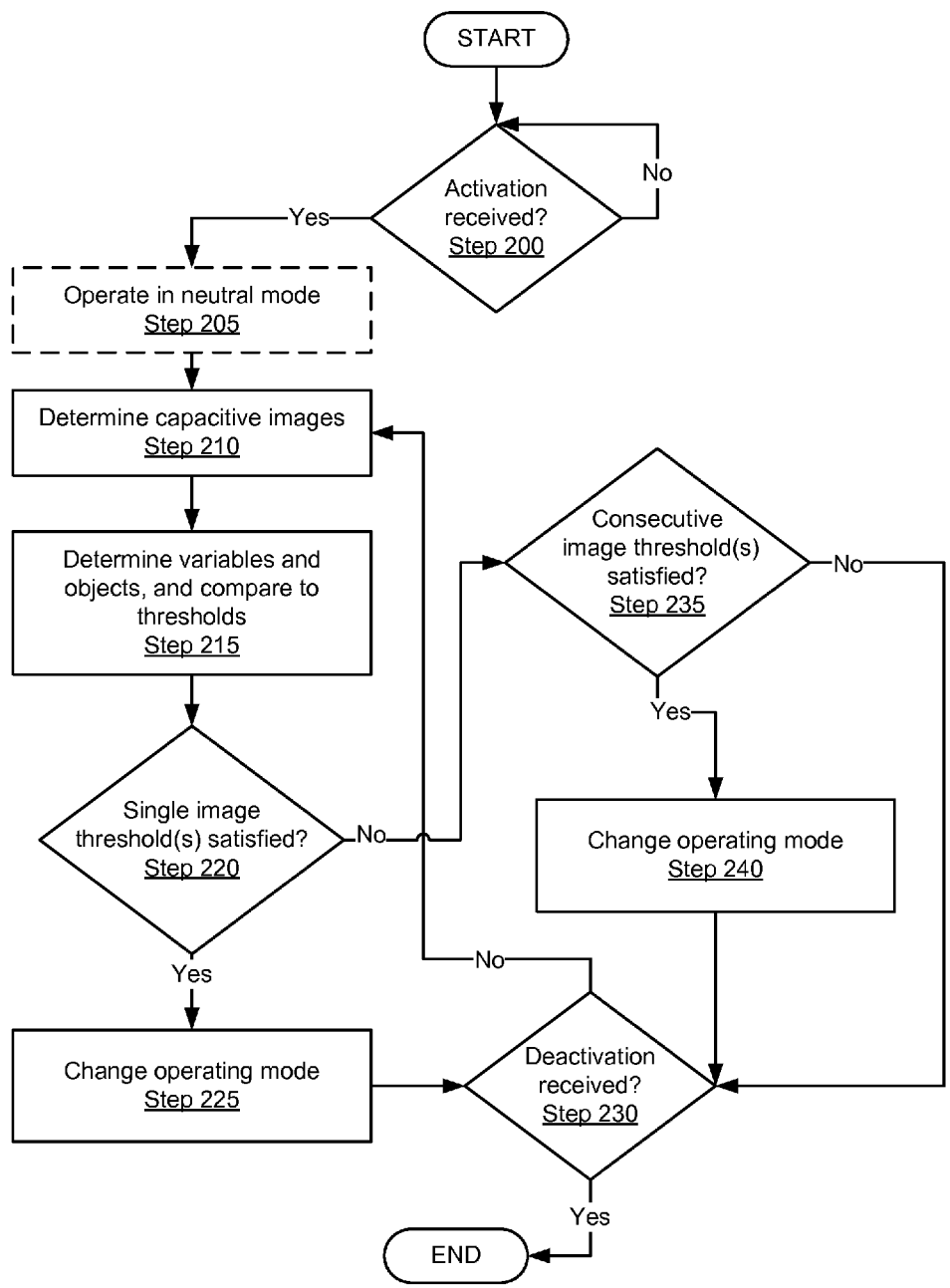
FIGS. 2-5 show flowcharts in accordance with one or more embodiments.

FIG. 2 shows a flowchart depicting a method for detecting large objects. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, a determination is made whether the processing system (e.g., Processing System (105)) or input device (e.g., Input Device (100)) has received an activation, in accordance with one or more embodiments. The activation may be received by any suitable component/module or method, and may be sent by any suitable component/module or method. In one or more embodiments, the activation is a request to place the processing system or input device into large object detection mode. For example, the activation may be a user hitting a button on the touch screen, such as when initiating a phone call, receiving a phone call, or at any other suitable moment. The activation may also be received from another sensing device. If an activation has not been received, the method waits until an activation has been received. If an activation has been received, the method proceeds to Step 205.

In Step 205, the processing system and/or input device operates in neutral mode, in accordance with one or more embodiments. During operation in neutral mode, data is collected and it is determined, based on the data, whether to transition into a different mode. Accordingly, the neutral mode is essentially a waiting period until the proper conditions are present to transition into a different mode including, for example, a finger mode for when the input(s) to the sensing device are fingers, and a large object mode for when the input(s) to the sensing device are large objects, such as a user's face. There may be any number of modes in addition to the neutral mode.

In Step 210, capacitive images are determined, in accordance with one or more embodiments. Capacitive images are determined from resulting signals obtained from the receiver electrodes within the sensing region (e.g., Sensing Region (125)). Capacitive images represent the input(s) to the sensing region at a given moment in time, and are determined at various intervals. Thus, a capacitive image may be determined every 10 milliseconds, every quarter of a second, every second, or any other frequency. Determinations and/or measurements may be made using a single capacitive image and/or a set of capacitive images (e.g., consecutive capacitive images).

In Step 215, variables and objects are determined and compared to thresholds, in accordance with one or more embodiments. The variables and objects may be determined in any manner now known or later developed, and the comparisons may be performed in any manner now known or later developed. In one or more embodiments, the specific variables, objects, and thresholds used, and the values thereof, may vary. For example, "threshold X" may be set to "5" as a default, but a user, manufacturer, retailer, or other entity may change "threshold X" to "3." As another example, a user, manufacturer, retailer, or other entity may remove an entire variable, object, or threshold (or add one) from consideration by the invention.

In Step 220, a determination is made whether any single image threshold(s) (i.e., thresholds that rely on only one capacitive image) have been satisfied, in accordance with one or more embodiments. There may be any number of single image thresholds, and they may cause a transition from any state to any other state. If the single image threshold(s) have not been satisfied, the method proceeds to Step 235. If the single image threshold(s) have been satisfied, then the method proceeds to Step 225.

In Step 225, the operating mode is changed, in accordance with one or more embodiments. The operating mode may be changed in any manner now known or later developed. Further, the operating mode may change from the current mode to any other available mode. In the new operating mode, features/components of the processing system and/or input device may be enabled or disabled (e.g., screen turned off/on, touch screen inputs enabled/disabled, and/or any other suitable action). Further, reporting mechanisms may be suppressed in the new operating mode.

In Step 230, a determination is made whether a deactivation has been received, in accordance with one or more embodiments. The determination may be made in any manner now known or later developed. As with Step 200, the deactivation may be received by any suitable component or method, and may be sent by any suitable component or method. In one or more embodiments, the deactivation is a request to disable the large object detection mode. For example, the deactivation may be a user hitting a button on the touch screen, such as when ending a phone call. As another example, the deactivation may be triggered by an input signal and/or an instruction from another sensing device. If a deactivation has not been received, the method returns to Step 210 to continue determining capacitive images. If a deactivation has been received, the process ends.

In Step 235, a determination is made whether a consecutive image threshold(s) (i.e., thresholds that rely on consecutive capacitive images) has been satisfied, in accordance with one or more embodiments. The determination may be made in any manner now known or later developed. Further, the consecutive images may be of any number or amount. For example, there may need to be two, four, or ten consecutive images that satisfy the same, or different, threshold(s). In one or more embodiments, there may be any number of different threshold(s) that are only satisfied when consecutive capacitive images satisfy the same requirement(s). If a consecutive image threshold(s) has not been satisfied, the method proceeds to Step 230. Alternatively, if a consecutive image threshold(s) has been satisfied, the method proceeds to Step 240.

In Step 240, the operating mode is changed, in accordance with one or more embodiments. As in Step 225, the operating mode may be changed in any manner now known or later developed. Further, the operating mode may change from the current mode to any other available mode. In the new operating mode, features/components of the processing system and/or input device may be enabled or disabled (e.g., screen turned off/on, touch screen inputs enabled/disabled, and/or any other suitable action). Further, reporting mechanisms may be suppressed in the new operating mode. After Step 240, the method proceeds to Step 230.

Figure 3:
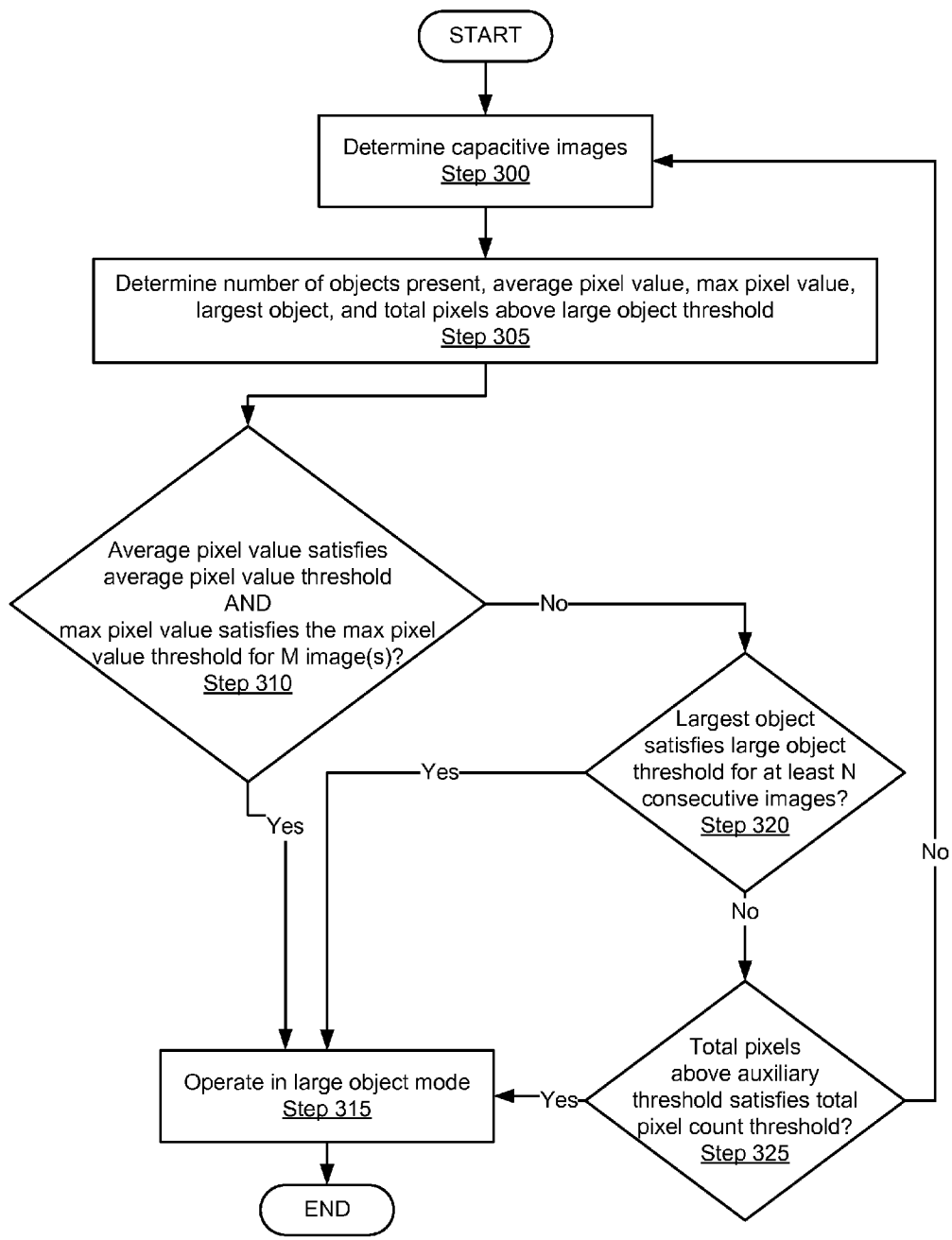

FIG. 3 shows a flowchart depicting a method for transitioning into large object mode. While the various steps in this flowchart are presented and described sequentially, one of ordinary skill in the art will appreciate that some or all of the steps may be executed in different orders and some or all of the steps may be executed in parallel. Further, one or more of the steps in FIG. 3 may be executed by the determination module (110), discussed above in reference to FIG. 1. Further still, in one or more embodiments, one or more of the steps described below may be omitted, repeated, and/or performed in a different order. Accordingly, the specific arrangement of steps shown in FIG. 3 should not be construed as limiting the scope of the invention.

In Step 300, capacitive images are determined, in accordance with one or more embodiments. As discussed above, the capacitive images may be determined from the resulting signals of the receiver electrodes in the sensing region.

In Step 305, the number of objects present in a capacitive image, the average pixel value in the capacitive image, the maximum pixel value in the capacitive image, the largest object in the capacitive image, and the total pixels in the capacitive image above an auxiliary threshold are determined, in accordance with one or more embodiments. Specifically, the above discussed variables and objects are calculated for each individual capacitive image, and may be calculated at any time, and in any manner now known or later developed. Further, additional variables may be calculated that are not mentioned here. Each individual variable and/or object is discussed below.

In one or more embodiments, the number of objects present refers to the number of individual objects detected in a given capacitive image. For example, if a user is touching the screen with two fingers, the number of objects present may be two. The number of objects may be calculated in any manner now known or later developed. Further, any number of objects may be detected in a given capacitive image, from zero to hundred(s) or more.

In one or more embodiments, the average pixel value refers to an average of the values of all pixels within a given region. The region may be the entire sensing region, a portion of the sensing region (e.g., the entire sensing region except for pixels near the perimeter), or any other amount.

In one or more embodiments, the max pixel value refers to the maximum value of an individual pixel within a given region. As discussed above, the region may be the entire sensing region, a portion of the sensing region (e.g., the entire sensing region except for pixels near the perimeter), or any other amount In one or more embodiments, the largest object refers to the object represented by the greatest numbers of pixels in the capacitive image.

In one or more embodiments, a count is taken as to all pixels within a region of the capacitive image having a pixel value satisfying an auxiliary threshold. This count is referred to as the total number of pixels. The auxiliary threshold may be set according to the resulting signals obtained from the receiver electrodes. The total number of pixels may be compared against a total pixel count threshold (discussed below). In one or more embodiments, the auxiliary threshold is satisfied when a pixel value exceeds the auxiliary threshold. Alternatively, the auxiliary threshold is satisfied when the pixel value meets or exceeds the auxiliary threshold.

In Step 310, a determination is made whether the average pixel value satisfies the average pixel value threshold AND whether the max pixel value satisfies the max pixel value threshold for M image(s), in accordance with one or more embodiments. The determination may be made in any manner now known or later developed. Specifically, Step 310 is only one of multiple ways to determine that a large object (i.e., a face) is touching, or very near to, the sensing region. Specifically, satisfying the average pixel value threshold may involve the average pixel value exceeding the threshold. Alternatively, satisfying the average pixel value threshold may involve the average pixel value being less than the threshold. Similarly, the max pixel value satisfying the max pixel value threshold may require that the max pixel value be less than the threshold. Alternatively, the max pixel value threshold may be satisfied when the max pixel value exceeds the threshold. Finally, the thresholds must be satisfied for "M" capacitive images, where is M is any natural number (e.g., M=1). In one or more embodiments, the M capacitive images must be consecutive images. If the thresholds are not satisfied (i.e., transition condition is not present), the method proceeds to Step 320. If the thresholds are satisfied (i.e., transition condition is present), the invention proceeds to Step 315.

In Step 315, the processing system and/or input device transitions into large object mode, in accordance with one or more embodiments. As discussed above, during operation in large object mode, various features and/or components of the processing system and/or input device may be disabled or enabled. In one or more embodiments, during operation in large object mode, user input to the sensing region is not reported (i.e., reporting of user input to the sensing region is suppressed). In one or more embodiments, operating in large object mode causes the touch screen to be turned off (i.e., because a user is actively on a phone call with the phone pressed to his or her face). Further, while operating large object mode, the one or more methods discussed above may continue to execute. That is, capacitive images may still be gathered to ensure that the large object has is still present in the sensing region of the device (which may cause a transition to the neutral state, or other suitable state). In one or more embodiments, the capacitive images may be gathered at a lower rate during operation in large object mode. After Step 315, the method ends.

In Step 320, a determination is made whether the largest object satisfies the large object threshold for at least N consecutive images. As discussed above, the largest object is the largest object by pixel count within a given region (i.e., the entire sensing region, or a portion thereof). The large object threshold may be any amount, such as 5 pixels, 500 pixels, 5000 pixels, etc. Further, the large object threshold may be set by any suitable party including the user, the manufacturer, the retailer, etc. Further, the large object threshold is satisfied when it has been satisfied for "N" consecutive images. "N" may be any number of capacitive images such as 1, 5, 8, 12, etc. It will be apparent to one of ordinary skill in the art, having the benefit of this disclosure, that Step 320 presents a second transition condition for triggering a transition to large object mode. If the threshold is satisfied, the method proceeds to Step 315. If the threshold is not satisfied, then the method proceeds to Step 325.

In Step 325, a determination is made whether the total pixels above the auxiliary threshold satisfy the total pixel count threshold. Further, the total pixel count threshold is a threshold indicating the total number of pixels necessary to decide that a large object is present, even if the large object is represented in the capacitive image as a set of smaller objects. Both the auxiliary threshold and the total pixel count threshold are tunable by any suitable party, such as the user, manufacturer, retailer, or other suitable party. The determination may be made in any manner now known or later developed. It will be apparent to one of ordinary skill in the art, having the benefit of this disclosure, that this is a third option for causing a transition to large object mode. If the total pixel count threshold is satisfied, the method proceeds to Step 315. If the total pixel count threshold is not satisfied, then the method returns to Step 300.

Figure 4:
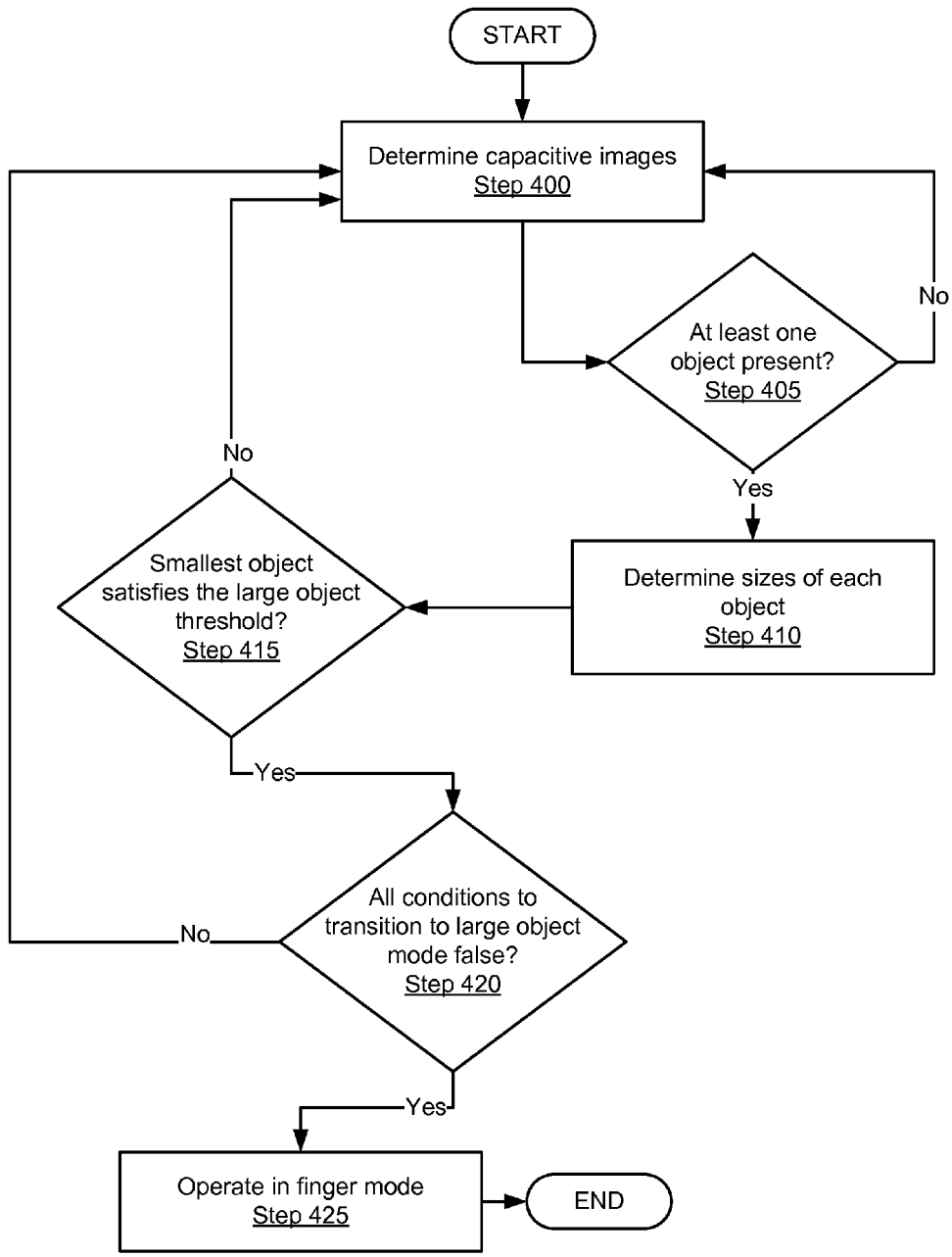

FIG. 4 shows a flowchart depicting a method for transitioning into finger mode. While the various steps in this flowchart are presented and described sequentially, one of ordinary skill in the art will appreciate that some or all of the steps may be executed in different orders and some or all of the steps may be executed in parallel. Further, one or more of the steps in FIG. 4 may be executed by the determination module (110), discussed above in reference to FIG. 1. Further still, in one or more embodiments, one or more of the steps described below may be omitted, repeated, and/or performed in a different order. Accordingly, the specific arrangement of steps shown in FIG. 4 should not be construed as limiting the scope of the invention.

In Step 400, capacitive images are determined, in accordance with one or more embodiments. As discussed above, the capacitive images may be determined in any manner now known or later developed, and any number of capacitive images may be gathered/determined.

In Step 405, a determination is made whether at least one object is present, in accordance with one or more embodiments. The determination may be made in any manner now known or later developed.

In Step 410, the sizes of each object(s) are determined, in accordance with one or more embodiments. As above, the sizes of the object(s) are based on the number of pixels identified as being part of the object(s). The sizes may be determined in any manner now known or later developed.

In Step 415, a determination is made whether the smallest object is smaller than the large object threshold, in accordance with one or more embodiments. The smallest object is the object represented by the fewest number of pixels in the capacitive image. The large object threshold, as described above, is a threshold, in pixels, above which the object is deemed to be a large object. Conversely, in one embodiment, when the size of an object is below the large object threshold, it is deemed to be a finger, stylus, or other non-large (i.e., small) object. If the object is larger than the large object threshold, then the method returns to Step 400. Alternatively, if the object is smaller than the large object threshold, the method proceeds to Step 420.

In Step 420, a determination is made whether all conditions to transition to large object mode are false, in accordance with one or more embodiments. The conditions to transition to large object mode are those described above in FIG. 3. In particular, the conditions are those of Steps 310, 320, and 325. The determination may be made in any manner now known or later developed. If one of the conditions is true, then the method returns to Step 400. If all conditions are false, then the method proceeds to Step 425.

In Step 425, the processing system and/or input device transitions into finger mode, in accordance with one or more embodiments. While operating in finger mode, one or more of the above mentioned threshold may be adjusted (e.g., increased) for determining that a large object is present, or any other suitable actions. Further, in finger mode, user input to the sensing region may be reported. After Step 425, the method ends.

Figure 5:
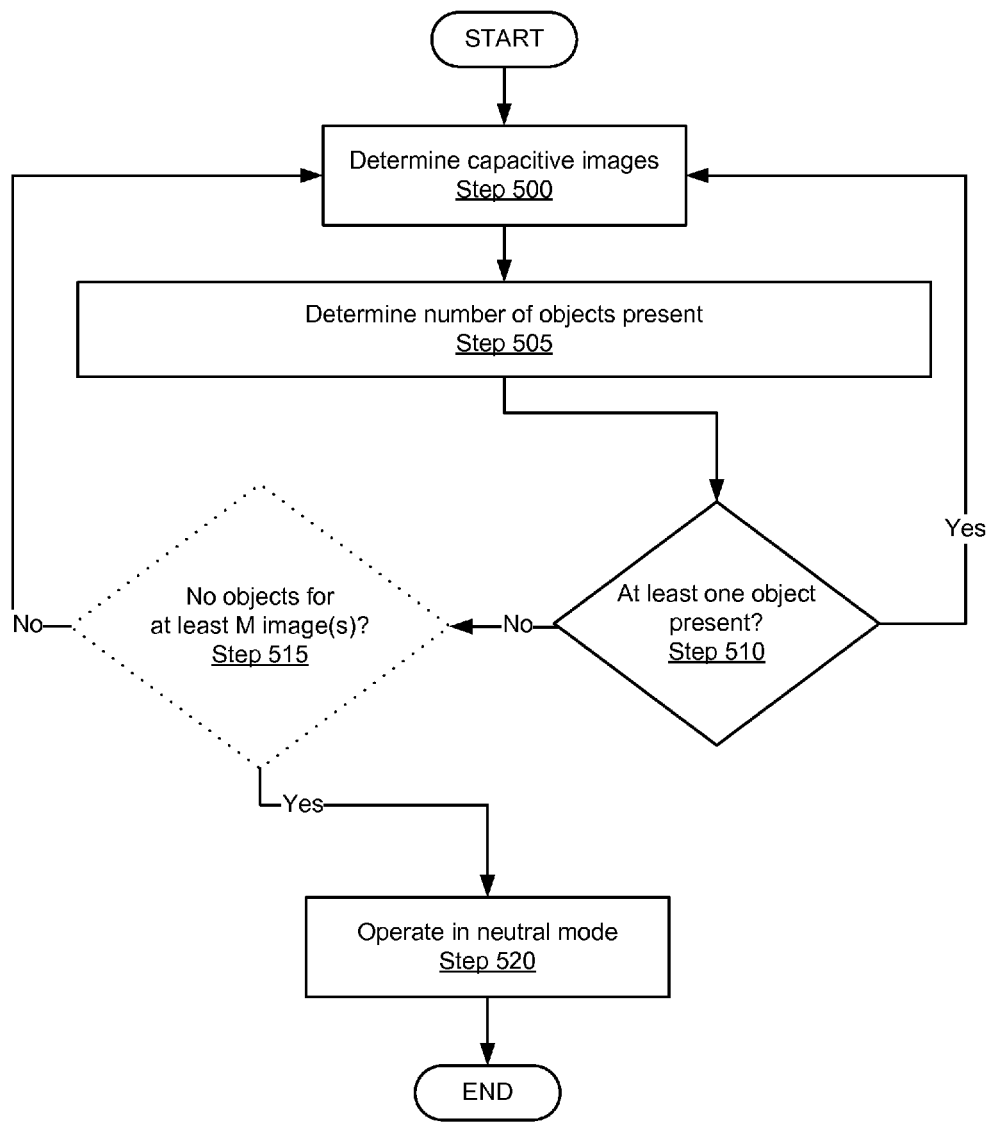

FIG. 5 depicts a flowchart of a method for transitioning back into neutral mode from finger mode or large object mode. While the various steps in this flowchart are presented and described sequentially, one of ordinary skill in the art will appreciate that some or all of the steps may be executed in different orders and some or all of the steps may be executed in parallel. Further, one or more of the steps in FIG. 5 may be executed by the determination module (110) discussed above in reference to FIG. 1. Further still, in one or more embodiments of the invention, one or more of the steps described below may be omitted, repeated, and/or performed in a different order. Accordingly, the specific arrangement of steps shown in FIG. 5 should not be construed as limiting the scope of the invention.

In Step 500, capacitive images are determined, in accordance with one or more embodiments. As discussed above, the capacitive images may be determined in any manner now known or later developed, and any number of capacitive images may be gathered/determined.

In Step 505, the number of objects present is determined, in accordance with one or more embodiments. As discussed above, the number of objects may be determined in any manner now known or later developed.

In Step 510, a determination is made whether at least one object is present, in accordance with one or more embodiments. As discussed above, the determination may be made in any manner now known or later developed.

In Step 515, a determination is made whether no objects have been present for M capacitive images, in accordance with one or more embodiments. As discussed above, the determination may be made in any manner now known or later developed. Further, "M" may be any natural number such as 2, 3, 5, or 8. In one or more embodiments, the M capacitive images are consecutive. Alternatively, the capacitive images need not be consecutive, but need to occur within a timeframe, such as within the last 15 frames, last 10 seconds, etc. If there has been an object within the last M capacitive images, then the method returns to Step 500. Alternatively, if there has not been an object within the last M capacitive images, the method proceeds to Step 520.

In Step 520, the processing system and/or input device transitions into neutral mode, in accordance with one or more embodiments. Neutral mode behaves as discussed above. After Step 520, the method ends.

It will be apparent to one of ordinary skill in the art, having the benefit of this disclosure, that there are many possible ways to determine when to transition from a first state to a second state. Thus, the invention should not be limited to the above examples. Further, many other variables, objects, and thresholds may be used within the spirit of the invention. Further still, each threshold may be individually tunable by any suitable party, such as the end user, the manufacturer, the retailer, or other suitable entity. It will be apparent to one of ordinary skill in the art, having the benefit of this disclosure, that by tuning the individual thresholds, a user or other entity is able to dictate and receive exactly the kind of performance and responsiveness desired.

Additionally, the invention should not be limited to the specific transitions described above. That is, FIGS. 3-5 describe transitioning from neutral mode to large object mode, neutral mode to finger mode, finger mode to neutral mode, and large object mode to neutral mode. Optionally, any suitable party may enable a transition directly from large object mode to finger mode, and/or finger mode directly to large object mode. In one or more embodiments, the thresholds and determinations for deciding when to transition are the same as from neutral mode to the respective state. In other words, transitioning from large object mode to finger mode may require that the same threshold(s) be satisfied as if transitioning from neutral mode to finger mode. Likewise, transitioning from finger mode directly to large object mode may require that the same threshold(s) be satisfied as if transitioning from neutral mode to large object mode.

Further still, in one or more embodiments, any, or all, of the thresholds described in the various figures may be dynamic. In other words, the thresholds may change as they are being satisfied. Thus, if "threshold X" needs to be satisfied for 4 consecutive frames before transitioning into a different mode, then "threshold X" may be lowered after it is satisfied for one frame. For example, if "threshold X" is 5, after the first frame satisfies "threshold X", the value of "threshold X" is reduced to 4, and the threshold is easier to satisfy in the next frame. Likewise, in frame 3, "threshold X" may be further reduced to 3. It will be apparent to one of ordinary skill in the art, having the benefit of this disclosure, that thresholds may be dynamically altered in many different ways and, thus, the invention should not be limited to the above example.

The following section describes various examples of the invention. The examples are included to aid in the understanding of the invention and are not intended to limit the scope of the invention.

Figure 6A:
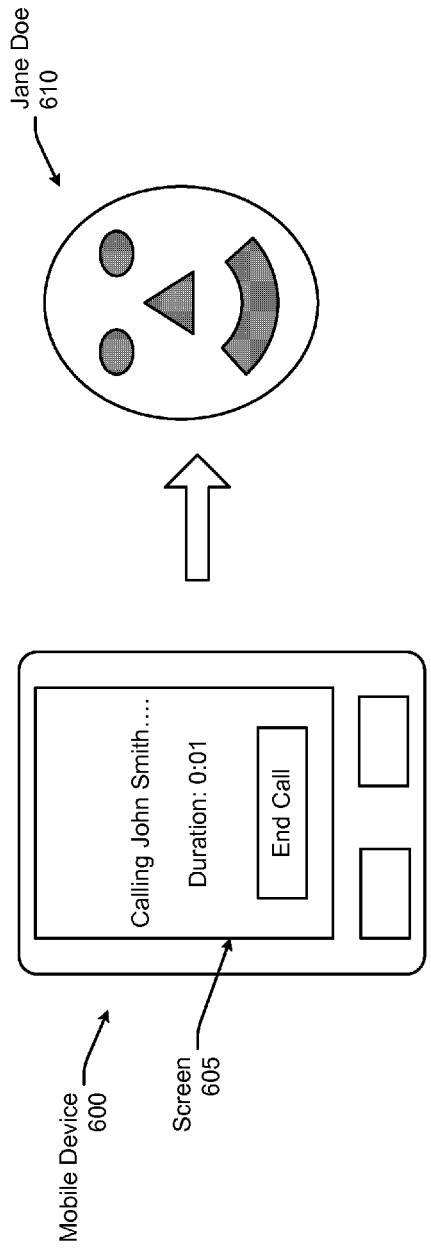
FIGS. 6A and 6B show an example in accordance with one or more embodiments.
Figure 6B:
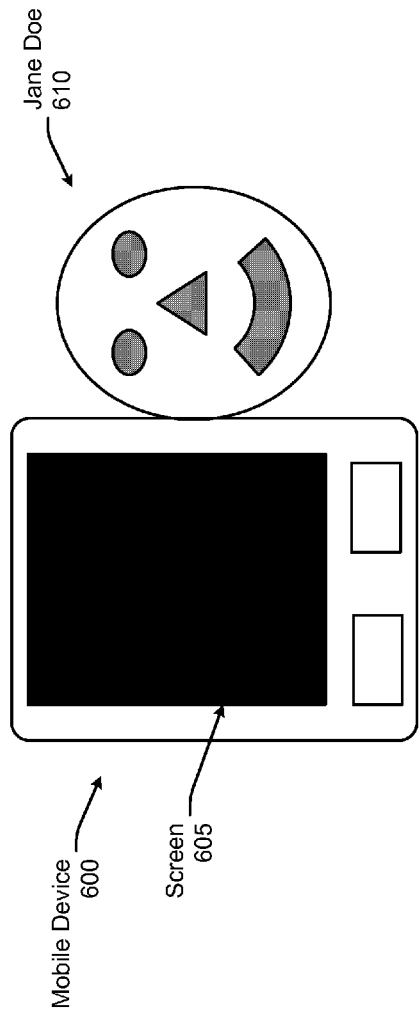

FIGS. 6A and 6B show an example of a device (i.e., mobile device (600)) detecting a face and transitioning into large object mode. Specifically, in FIG. 6A, mobile device (600) is shown shortly after jane doe (610) had initiated a phone call to John Smith. This is shown on screen (605), which doubles as a, touchscreen. While not shown, upon initiating the phone call, mobile device (600) received an activation of large object detection and entered the neutral mode, and began looking for an approaching large object—namely jane doe's (610) face.

The example continues in FIG. 6B, where jane doe (610) has placed the phone against her face. At some point prior to this occurring, screen (605) detected the approaching large object, and one of the three transition conditions was present. In response to entering large object mode, screen (605) was darkened. While three ways to transition into large object mode were discussed above in FIG. 3, there may be any number of criteria to transition into large object mode. To continue the example, when jane doe (610) subsequently removes her face from mobile device (600) (not shown), mobile device (600) will detect that no objects are present on screen (605), the mode will transition back to neutral mode, and jane doe (610) will be able to end the call. Upon ending the call (not shown) mobile device (600) will receive a deactivation request, and large object detection will end.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system configured to detect large objects, comprising:
a sensor module comprising sensor circuitry coupled to a plurality of transmitter electrodes and a plurality of receiver electrodes, wherein the sensor module is configured to transmit transmitter signals with the plurality of transmitter electrode and receive resulting signals with the plurality of receiver electrodes, and wherein the resulting signals comprise effects corresponding to transmitter signals; and
a determination module configured to:
determine an average pixel value of a first plurality of capacitive pixel values in a first capacitive image, wherein the first capacitive image is based on the resulting signals;
determine a maximum pixel value of the first plurality of capacitive pixel values;
determine a transition condition is present based on the first capacitive image, wherein the transition condition is based on the average pixel value satisfying an average pixel value threshold, and that the maximum pixel value is less than a maximum pixel value threshold; and
operate in a large object mode based on the transition condition being present.

2. The processing system of claim 1, the determination module further configured to:
determine a second capacitive image based on the resulting signals, the second capacitive image comprising a second plurality of capacitive pixel values;
determine a first number of the first plurality of capacitive pixel values exceeding an auxiliary threshold and a second number of the second plurality of capacitive pixel values exceeding the auxiliary threshold,
wherein the first capacitive image and the second capacitive image are consecutive capacitive images, and
wherein the transition condition is based on the first number and the second number satisfying a total count threshold.

3. The processing system of claim 2, the determination module further configured to:
reduce the total count threshold in response to the first number satisfying the total count threshold.

4. The processing system of claim 1, the determination module further configured to:
determine a second capacitive image based on the resulting signals; and
determine a largest object in the first capacitive image and a largest object in the second capacitive image,
wherein the transition condition requires that the largest object in the first capacitive image and the largest object in the second capacitive image have sizes satisfying a large object threshold.

5. The processing system of claim 1, the determination module further configured to:
operate in a neutral mode; and
transition to operating in a finger mode, based on a size of a smallest object being less than a large object threshold, wherein the size of the smallest object is from a second capacitive image based on the resulting signals.

6. The processing system of claim 1, wherein finger reporting is suppressed during operation in the large object mode.

7. The processing system of claim 1, the determination module further configured to:
receive a request to activate large object detection, wherein the request is a first external trigger signal; and
receive a request to deactivate large object detection, wherein the request is a second external trigger signal.

8. The processing system of claim 1, the determination module further configured to:
determine, during operation in the large object mode, a second capacitive image based on the resulting signals; and
operate, based on a determination that no objects are present in the second capacitive image, in a neutral mode.

9. A method for detecting large objects using a processing system, comprising:
driving transmitter signals onto a plurality of transmitter sensor electrodes;
receiving resulting signals with a plurality of receiver sensor electrodes;
determining an average pixel value of a first plurality of capacitive pixel values in a first capacitive image, wherein the first capacitive image is based on the resulting signals;
determining a maximum pixel value of the first plurality of capacitive pixel values;
determining a transition condition is present based on the first capacitive image, wherein the transition condition is based on the average pixel value satisfying an average pixel value threshold, and that the maximum pixel value is less than a maximum pixel value threshold; and
operating in a large object mode based on the transition condition being present.

10. The method of claim 9, further comprising:
determining a second capacitive image based on the resulting signals, the second capacitive image comprising a second plurality of capacitive pixel values;
determining a first number of the first plurality of capacitive pixel values exceeding an auxiliary threshold and a second number of the second plurality of capacitive pixel values exceeding the auxiliary threshold,
wherein the first capacitive image and the second capacitive image are consecutive capacitive images, and
wherein the transition condition is based on the first number and the second number satisfying a total count threshold.

11. The method of claim 9, further comprising:
determining a second capacitive image based on the resulting signals; and
determining a largest object in the first capacitive image and a largest object in the second capacitive image,
wherein the transition condition requires that the largest object in the first capacitive image and the largest object in the second capacitive image have sizes satisfying a large object threshold.

12. The method of claim 9, further comprising:
operating in a neutral mode; and
transitioning to operating in a finger mode, based on a size of a smallest object being less than a large object threshold, wherein the size of the smallest object is from a second capacitive image based on the resulting signals.

13. An input device for detecting large objects, comprising:
a plurality of transmitter electrodes;
a plurality of receiver electrodes,
a processing system, the processing system coupled to the plurality of transmitter electrodes and the plurality of receiver electrodes, the processing system configured to:

drive transmitter signals onto a plurality of transmitter sensor electrodes;

receive resulting signals with a plurality of receiver sensor electrodes;

determine an average pixel value of a first plurality of capacitive pixel values in a first capacitive image, wherein the first capacitive image is based on the resulting signals;

determine a maximum pixel value of the first plurality of capacitive pixel values;

determine a transition condition is present based on the first capacitive image, wherein the transition condition is based on the average pixel value satisfying an average pixel value threshold, and that the maximum pixel value is less than a maximum pixel value threshold; and operate in a large object mode based on the transition condition being present.

14. The input device of claim 13, the processing system further configured to:

determine a second capacitive image based on the resulting signals, the second capacitive image comprising a second plurality of capacitive pixel values;

determine a first number of the first plurality of capacitive pixel values exceeding an auxiliary threshold and a second number of the second plurality of capacitive pixel values exceeding the auxiliary threshold, wherein the first capacitive image and the second capacitive image are consecutive capacitive images, and wherein the transition condition is based on the first number and the second number satisfying a total count threshold.

15. The input device of claim 13, the processing system further configured to:

determine a second capacitive image based on the resulting signals; and determine a largest object in the first capacitive image and a largest object in the second capacitive image, wherein the transition condition requires that the largest object in the first capacitive image and the largest object in the second capacitive image have sizes satisfying a large object threshold.

16. The input device of claim 13, wherein the plurality of transmitter electrodes and the plurality of receiver electrodes are on a same layer.

17. The input device of claim 13, wherein the plurality of transmitter electrodes and the plurality of receiver electrodes are disposed orthogonal to each other.

* * * * *